(12) United States Patent
James

(10) Patent No.: US 6,633,829 B2
(45) Date of Patent: Oct. 14, 2003

(54) MECHANICAL ROTATION AXIS MEASUREMENT SYSTEM AND METHOD

(75) Inventor: Gordon E. James, San Pedro, CA (US)

(73) Assignee: Northrop Grumman Corporation, Redondo Beach, CA (US)

(*) Notice: Subject to any disclaimer, the term of this patent is extended or adjusted under 35 U.S.C. 154(b) by 60 days.

(21) Appl. No.: 09/917,455

(22) Filed: Jul. 26, 2001

(65) Prior Publication Data

US 2003/0097236 A1 May 22, 2003

(51) Int. Cl.[7] ................................................. G01C 9/00
(52) U.S. Cl. ......................................................... 702/151
(58) Field of Search ...................... 702/151, 7; 382/131, 382/155; 378/14; 324/207; 708/811; 73/178; 701/1; 343/100; 318/16

(56) References Cited

U.S. PATENT DOCUMENTS

| | | | | |
|---|---|---|---|---|
| 3,474,241 A | * | 10/1969 | Kuiprs | 704/811 |
| 3,660,648 A | * | 5/1972 | Kuipers | 708/811 |
| 3,983,474 A | * | 9/1976 | Kuipers | 324/207.18 |
| 4,318,300 A | * | 3/1982 | Maughmer | 73/178 R |
| 5,128,864 A | * | 7/1992 | Waggener et al. | 378/14 |
| 5,546,472 A | * | 8/1996 | Levin | 382/131 |
| 5,960,370 A | * | 9/1999 | Towle et al. | 702/7 |
| 6,134,344 A | * | 10/2000 | Burges | 382/155 |
| 6,332,103 B1 | * | 12/2001 | Steenson et al. | 701/1 |

* cited by examiner

*Primary Examiner*—John Barlow

(57) ABSTRACT

A system, apparatus (60) and method (20) of determining an average axis of rotation (Wf) and defined center of rotation ($C_r$) of a rotatable device (10) having a rotation axis which is nominally fixed in global coordinates (X,Y,Z) and having a plurality of target points (P1–PN) affixed thereon. It comprise a data collector (62) for obtaining target point location data from the device target points (P1–PN) for a plurality of rotated positions, a transformer (64) for translating and rotating the target point data in global coordinates, and an iterative algorithm (66) for positioning a secondary coordinate system (U,V,W) to be coincident with the axis of rotation (Wf), and defined center of rotation ($C_r$) of the rotatable device (10).

28 Claims, 4 Drawing Sheets

MECHANICAL ROTATION AXIS MEASUREMENT SYSTEM AND METHOD

CROSS-REFERENCE TO RELATED APPLICATION

The following U.S. patent application is commonly assigned and is hereby incorporated herein by reference: Ser. No. 09/119,679, filed Jul. 21, 1998 by Glick et al. entitled "Rotational Axis Determination from Photogrammetric Data."

The U.S. government has certain rights in this invention pursuant to FAR 52.227-12.

BACKGROUND OF THE INVENTION

Often, the successful operation of a rotating device is dependent on the ability to obtain proper alignment of the device rotational axis or axes. For example, with single or multiple axis rotating mechanical devices such as spacecraft unit positioners or pointing mechanisms, it is often required to measure and verify the rotational axes and defined centers of rotation of the rotating device.

Conventional techniques for determining the average axis of rotation can be ineffective and inaccurate. Prior art techniques typically rely upon manual operation and repeated readings, and are extremely slow. For example, a human observer may be required to align a single-point measuring device such as a telescope or theodolite multiple times on a limited number of targets to obtain approximate axis data.

What is needed in the art is an apparatus and method for determining the average axis and defined center of rotation for a rotating device that is accurate, time and cost efficient.

SUMMARY OF THE INVENTION

The present invention achieves technical advantages as a system and method for computing the rotational axis or axes and center(s) of rotation for a rotational device having one or more axes of rotation. In one embodiment, disclosed is a system for determining an average axis of rotation and center of rotation of a rotatable device having a plurality of target points affixed thereon. The system comprises a data collector adapted to obtain data from the device target points for a plurality of rotated positions, a transformer adapted to rotate and translate the obtained point data, and an iterative algorithm to position a secondary coordinate system to be coincident with the axis of rotation and center of rotation for one or more rotation axes of the rotatable device. The transformer and iterative algorithm can be applied sequentially to obtain each rotation axis and center of rotation of a multiple axis device using data from the data collector.

Also disclosed is an apparatus for determining an average axis of rotation and defined center of rotation for a rotatable device having a plurality of target points affixed thereon. The apparatus comprises a data collector adapted to obtain global coordinates of the target points at a plurality of rotations of the rotatable device, a transformer adapted to translate and rotate the obtained target point global coordinates, and an iterative algorithm to position a secondary coordinate system to be coincident with the rotatable device axis of rotation.

Further disclosed is a method for determining an average axis of rotation of a rotational device having a plurality of target points affixed thereon. The method comprises the steps of obtaining target point data from the plurality of target points and translating and rotating the obtained target point data to position a secondary coordinate system to be coincident with the axis and defined center of rotation of the rotatable device.

The present invention provides several advantages in measuring the rotational axis and locating the defined center of rotation of a rotatable body. The rotation axis location and defined center of rotation are calculatable with the use of the present invention. Rotational axis lateral runout and angular wobble errors may also be determined. Independent measurement of body rotations between point measurements is not required. The method may be applied to rotation ranges of less than one full revolution, if required by mechanism or facility limitations. The target point data location information is used directly, reducing complexity, inaccuracy and solution time compared with prior art methods that may lose information due to converting data to auxiliary vectors. The invention uses specific coordinate translations and Euler rotations to facilitate the generation of unambiguous location and orientation knowledge for a rotation axis having any arbitrary orientation in global coordinates. The accuracy of the present invention improves as the number of target points increases and as the radius from each target point away from the rotation axis increases.

BRIEF DESCRIPTION OF THE DRAWINGS

In the drawings, which form an integral part of the specification and are to be read in conjunction therewith.

Like numerals and symbols are employed in different figures to designate similar components in various views unless otherwise indicated.

DETAILED DESCRIPTION OF PREFERRED EMBODIMENTS

Previous methods of measuring the average axis of rotation of a rotatable body typically employ methods of collecting data relating to the average axis of rotation which are generally inaccurate and laborious, relying upon manual operation and repeated single-point readings. For example, optical instruments such as multiple theodolites are typically utilized in conjunction with mirrors mounted on the rotatable device to approximate the average axis of rotation. A theodolite typically comprises a gimballed telescope which is rotatable about vertical and horizontal axes, and is fitted with vertical and horizontal circular scales against which the angular position of the telescope may be measured after it has been manually aligned to a remote mirror target. Data representing the azimuthal direction of the target from the theodolite location and elevational angle of the target above or below the horizontal is attained. This technique requires a human observer to both align the telescope on the target and read the azimuth and elevation data from the circular scales. Because manual operation and repeated readings are required, this technique is extremely slow, costly and subject to error.

Copending U.S. patent application entitled "Rotational Axis Determination From Photogrammetric Data" filed on Jul. 21, 1998 by Glick, et al. and commonly assigned to TRW Inc. discloses a method of determining a rotational axis of a rotating body by gathering photogrammetric data of targets on the rotating body, assigning each photogrammetric data point a unique identification, and determining auxiliary vectors based upon the data points to determine the average axis of a rotation. The average axis of rotation is determined by the resulting rotation of the auxiliary vectors about the drive axis. The vector method requires the analyst to generate the auxiliary vectors, and to determine an initial approximate orientation of the rotation axis of the rotating device in global coordinates. The auxiliary vector method is relatively difficult to use.

Figure 1:
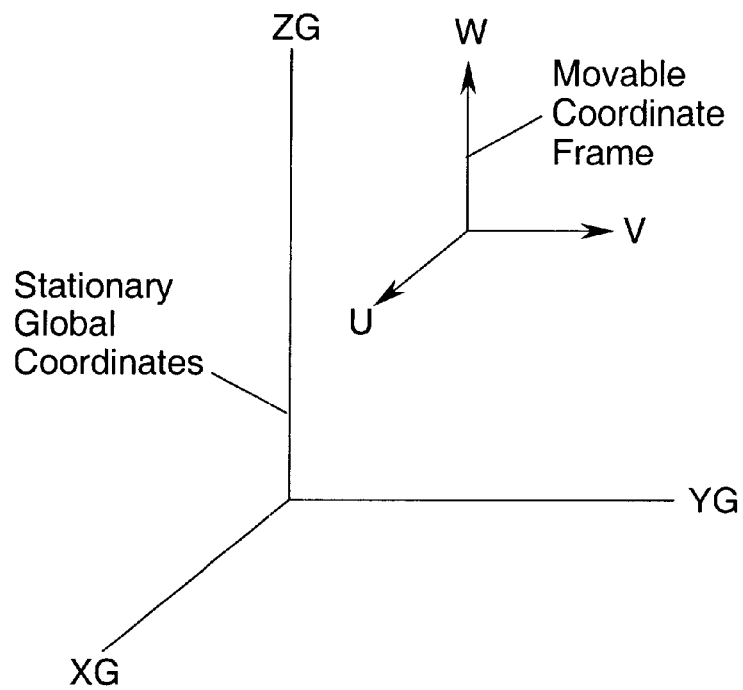
FIG. 1 shows the stationary global G coordinate system and the moveable UVW coordinate frame used to describe the present invention.
Figure 2:
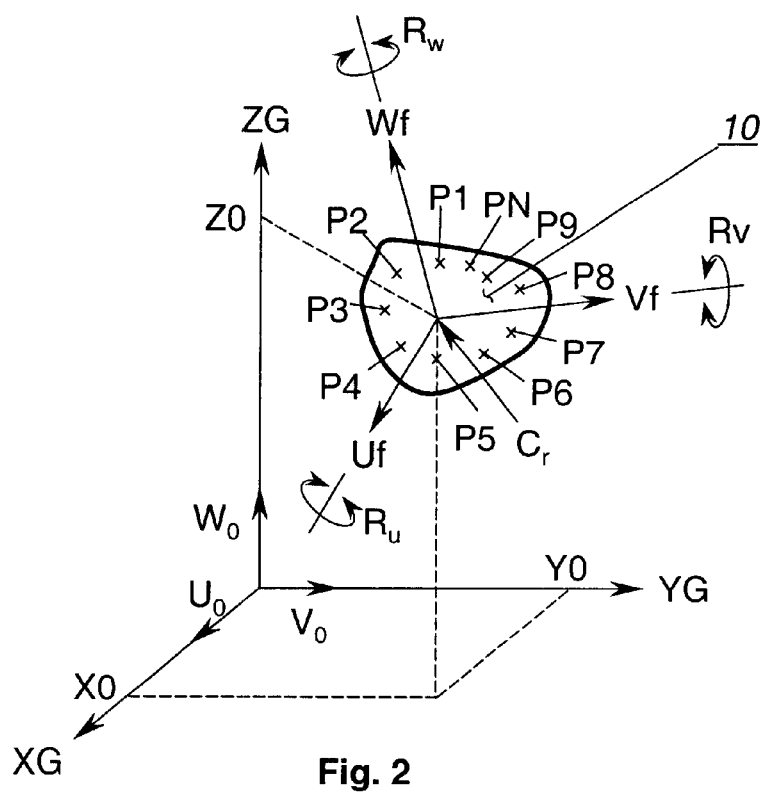
FIG. 2 is a generalized view of a rotational device, 10, having target points that are utilized in accordance with the present invention to determine the average axis of rotation. For a device having multiple axes of rotation, FIG. 2 applies separately to each independent rotation axis of the device.

The present invention achieves technical advantages as a method and apparatus for measuring the rotational axis of a rotating body without relying on auxiliary vectors by not requiring initial knowledge of the attitude of the rotational axis, and by providing the location of the defined center of rotation. FIG. 1 illustrates the two coordinate systems used to find the axis and center of rotation of the rotatable device. The global G coordinate frame is the reference for the target measurements described below. The stationary portion of the rotatable device is fixed in G coordinates. The UVW frame is free to move from some arbitrary initial position and attitude relative to the G frame. The present invention moves the UVW frame so that the final W axis (Wf) is parallel to the average rotation axis, and the origin is coincident with the defined center of rotation of the rotatable device. FIG. 2 shows one rotation axis, Wf, of a rotatable device 10 with a measurement target array P1 through PN attached. The device may have one or more axes of rotation, and the rotational range about each axis may be less than one revolution. The present invention can be applied separately to each rotation axis. The rotation axis vector to be measured is held stationary so that it has a nominally fixed attitude in G coordinates during the axis measurement. The device output shaft or flange 10, or an attachment to the shaft or flange 10, is rotatable about axis Wf and provides a body for attaching measurement targets P1 through PN which rotate with the shaft. The targets can be regularly or randomly placed, or both, and do not have to be in a common plane. Often, the output flange has convenient interface holes which can be used for target attachment. A local coordinate frame, UVW, is initially coincident with the G coordinate frame, $U_0$, $V_0$, $W_0$, or any other location and attitude which is defined in G coordinates. By means of the target data and analytical transformer described herein, the UVW frame is moved from its initial location and attitude, $U_0$, $V_0$, $W_0$, during the calculations and made to be coincident with the average axis of rotation and defined center of rotation of the rotatable device 10. The calculated axis vector Wf and defined center of rotation $C_r$ are transformed to the G coordinate frame for final data output. The defined center of rotation $C_r$ can be any point of interest on the rotation axis Wf. For example, $C_r$ can be defined to lie in the output shaft interface plane to provide shaft and flange location verification in G coordinates.

The target points P1–PN may be measured photogrammetrically or videogrammetrically, for example, to produce locations of the target points P1–PN in G coordinates. The rotation range of the rotatable device 10, which may be less than 360 degrees, is divided into a convenient number, k, of angular increments. The targets P1–PN are measured at the beginning of the first increment. Then the device 10 is rotated to the beginning of the second increment, and the target points P1–PN are measured again. The measurement of the coordinates of the target points P1–PN is repeated for each incremental rotation of the device 10, and at the end of travel, for a total of k+1 measurement sets. The accuracy of the calculated rotation axis and center of rotation improves with increasing placement distance of the targets P1–PN from the rotation axis, increased angular distribution of the targets, increased number of targets, increased total rotation range, increased number of increments (measurement sets), and increased target measurement accuracy. A reasonable choice of measurement parameters can produce axis knowledge better than 0.01 degrees cone half angle.

The rotatable device 10 is free to rotate about axis Wf which is nominally fixed in global G coordinates. The device 10 is rotated sequentially about Wf through its range of motion, which range may be less than 360° or larger than 360°, depending on physical constraints in the mechanism of the device 10 and the testing facility. The three dimensional positions (XG, YG, ZG) of an array of target points P1–PN fixed on the body 10 are measured in global G coordinates at each rotation position. The attitude and position of a secondary rotating coordinate system UVW are made to coincide with the average rotation axis and defined center of rotation of device 10 in G coordinates in accordance with the present invention by means of coordinate translations, ordered Euler rotations, and an iterative optimization routine such as Excel Solver. The target point location data obtained from target points P1–PN are used directly to obtain complete axis information, rather than being first converted to auxiliary vectors.

The local coordinate system UVW is translated by an amount X0, Y0, Z0 and rotated about the UVW axes through Euler angles Ru, Rv, Rw until the measured point locations of targets P1–PN are nominally invariant in UVW coordinates for each incremental target point P1–PN data set. The translations X0, Y0, Z0 locate the UVW origin at the center of rotation $C_r$ which has been defined to lie on the calculated rotation axis at a known distance in the Wf direction relative to a target or targets on a known feature of the rotatable body, for example, the intersection of the rotation axis and the interface plane, or normal to the plane, of the output flange. The translations are the same for each data set. The rotations Rw1–Rwk about Wf rotate the UVW frame to follow the angular increments between measurement data sets. The calculated values of the rotations about Wf are nominally equal to the angular increments. The rotations Ru and Rv about U and V align the UV plane relative to each target data set. The calculated values Ru and Rv are the same for each target data set.

In this way, the Wf axis is made to be coincident with the body 10 average rotational axis Wf, and the UVW origin is coincident with a defined center of rotation $C_r$ arbitrarily defined along rotational axis Wf relative to the measured points P1–PN. The average rotation axis vector Wf and the center of rotation $C_r$ on the body are then transformed to G coordinates to provide the final output data.

The present system and method calculates how far the device 10 rotated about axis Wf between target point measurement data sets. These rotation estimates can be used for diagnostic evaluation if the axis angular rotations are measured independantly using an angular measurement device such as a resolver or encoder. Also, Wf axis attitude wobble and center of rotation $C_r$ location positional variation in G coordinates may be determined in accordance with the present invention by subtracting measurement uncertainty from the calculated variations in the nominally invariant rotational axis Wf and center of rotation $C_r$.

Figure 3:
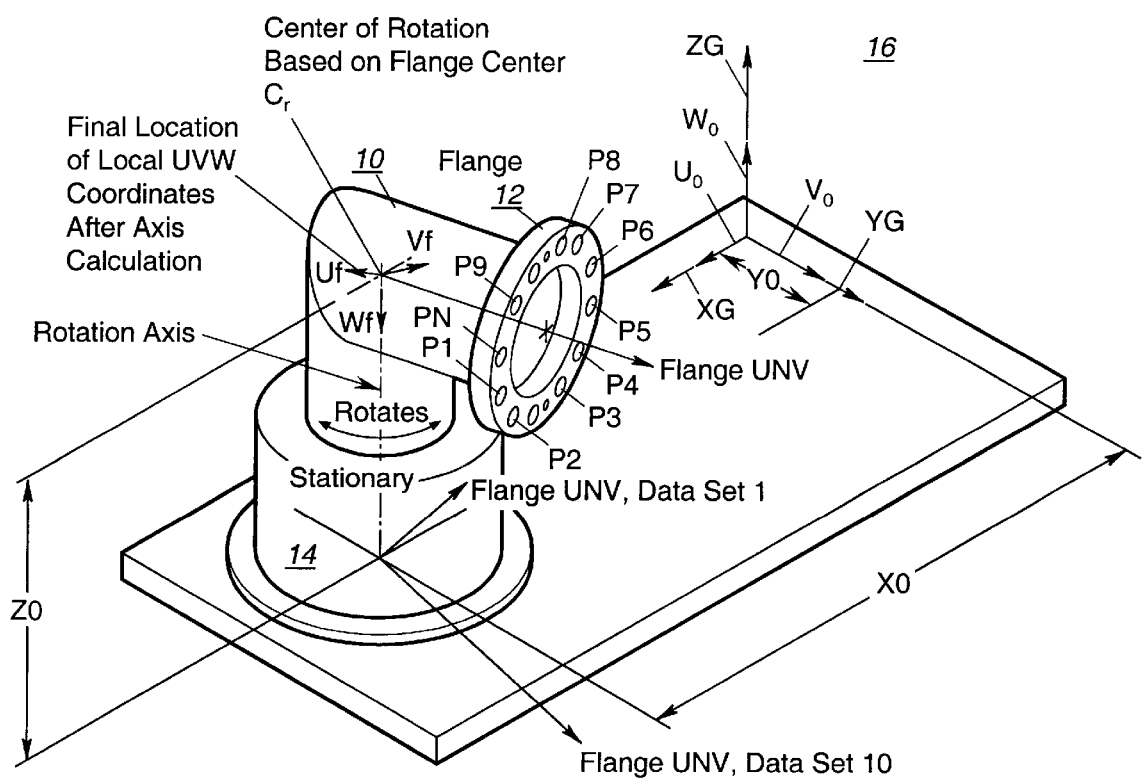
FIG. 3 is a perspective view of a single-axis rotational device example upon which target points P1 through PN are measured in global coordinates (XG,YG,ZG) and transformed to a secondary coordinate system (U,V,W) to determine the rotation axis and center of rotation.

Next, an illustrative use of the present invention will be described. FIG. 3 shows a perspective view of a rotatable device 10 comprising an output flange 12 with measurement targets P1–PN attached to interface bolt holes on the flange, for example. The targets P1–PN preferably provide highly reflective surfaces to facilitate measurement and are spaced apart from each other to provide adequate lever arms for rotation axis tilt calculations. The initial attitude and location of the local UVW coordinate frame relative to the global G coordinate frame before the rotational axis calculation is represented by vectors $U_0$, $V_0$, $W_0$, arbitrarily made to be coincident with the G frame for this example. Initially, nothing is assumed to be known about the rotation axis except that it is nominally stationary (does not tilt or translate) in G coordinates during the measurement. The device 10 comprises a rotary drive mechanism having a mechanical rotation axis along vector Wf. Stationary portion 14 remains fixed in G coordinates while the device 10 is free to rotate about axis Wf. The device 10 is positioned at one end of the rotation range (at a counter-clockwise rotational mechanical stop, for example), and the target locations P1–PN are measured in G coordinates to create data set 1. The device 10 is then rotated through an increment (⅑ of the total rotation range, for example) and stopped for the next data measurement set. The device can be rotated continuously if the relative measurement time (exposure time) is small enough to limit measurement error (image smear) to an acceptable value. The process is repeated until the last set, data set 10, is measured at the other end of the rotation range (at a clockwise rotational mechanical stop, for example).

Figure 4:
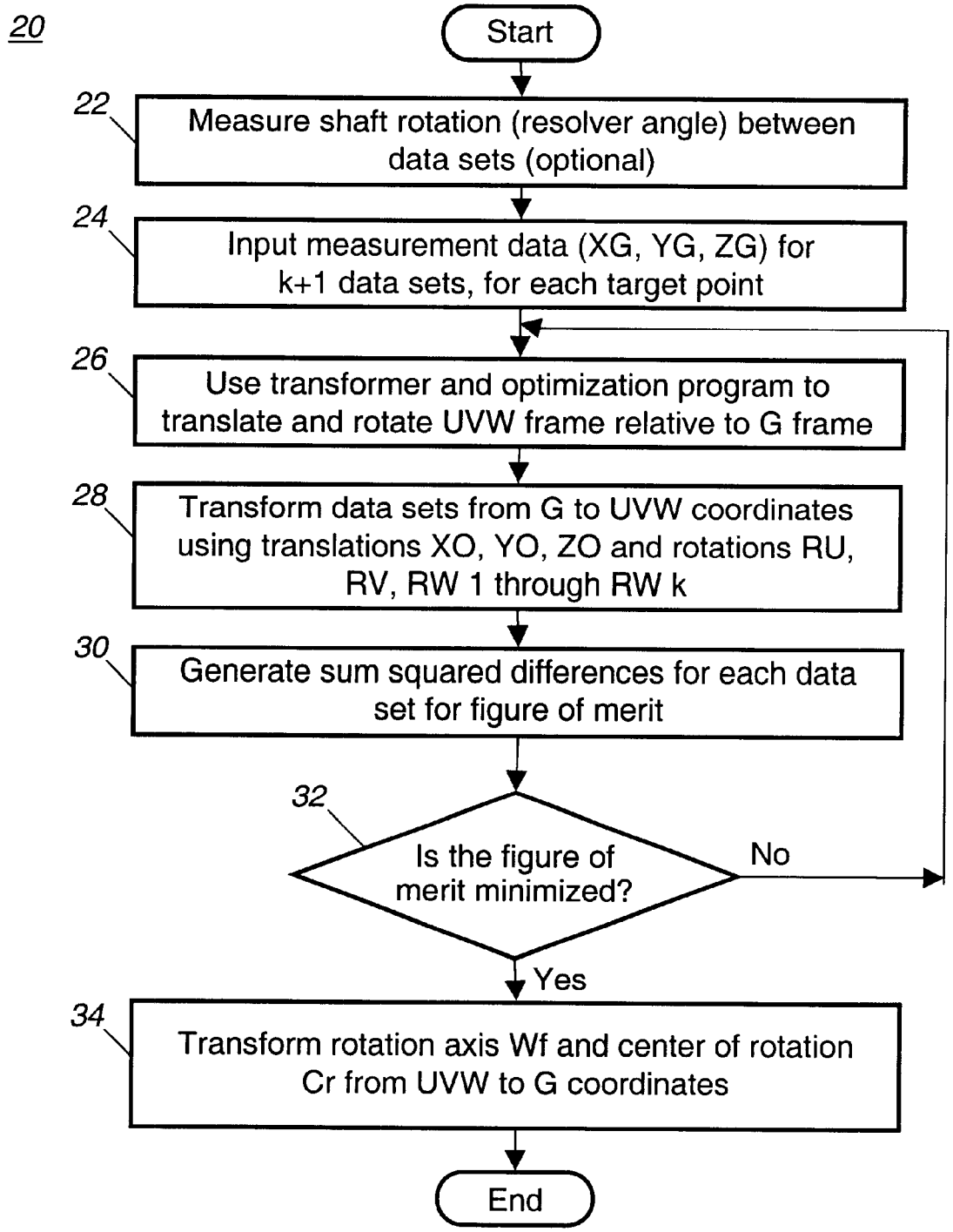
FIG. 4 is a flow chart of the algorithm for calculating the average axis of rotation and center of rotation for a rotatable device in accordance with the present invention.

FIG. 4 illustrates the algorithm of the present invention generally in the flow chart 20. The shaft rotation angle is measured between data sets in optional step 22, using a resolver, for example. The shaft is rotated through k angular increments, and input measurement target location data (XG, YG, ZG) are obtained for k+1 data sets for each target point P1–PN, in global G coordinates (step 24). The input measurement data (XG, YG, ZG) will be used for the rotational axis and center of rotation calculation in the loop (steps 26, 28, 30, 32).

In step 26 the algorithm assigns initial values (zero for example) to the translations X0, Y0, Z0 and rotations RU, RV, RW1 through RWk of FIG. 2.

Steps 26 through 32 form an iterative calculation loop in which the optimization routine modifies the initial translation and rotation values to minimize the figure merit. For each iteration, the algorithm generates new translated and rotated UVW coordinate frames (step 26), transforms each measured data set to the appropriate UVW frame (step 28), and calculates a new figure of merit (step 30) which includes data from all the frames in that iteration.

The algorithm generates k+1 UVW frames during each iteration loop, one for each data set. The UVW frames in a particular iteration differ only in the rotations RW which the optimization routine uses to approximate the incremental rotations of the rotatable device between the original measurement data sets. The values of X0, Y0, Z0, RU, and RV are the same for each of k+1 UVW frames during an iteration. This feature simplifies the algorithm and reduces calculation time.

The transformer uses Euler rotations to rotate the UVW coordinate frames during each iteration loop. The resulting unambiguous large rotation capability of the algorithm eliminates the need for prior knowledge of the approximate attitude of the rotation axis Wf and reduces calculation time by simplifying the transformations and eliminating the need for operator input and decisions.

The figure of merit in step 32 is the sum of the sum squared distances between like targets in data sets 2 and 1, 3 and 1, etc., through sets k and 1. This forms a simple non-biased error function which includes all data sets, but other non-biased formulations will also provide accurate solutions. The nominal figure of merit (sum squared distance total) is zero for the ideal case where measurement errors and rotatable device rotation wobble and center of rotation translation jitter at zero.

After the figure of merit is minimized at step 32, the UVW origin has been translated to the defined center of rotation $C_r$ location X0, Y0, Z0, FIGS. 2 and 3, and the W axis has been made parallel to the rotatable device average rotation axis Wf. The location of a particular target in each of K+1 data sets is nominally the same relative to each of K+1 UVW frames. The UVW frames, one for each data set, differ only in the rotation angles RW1 through RWk about Wf.

The data sets are nearly identical to each other after they are transformed to their particular final solution UVW coordinate frames. The degree to which they are different, frame to frame, is a measure of the combined measurement uncertainty and rotation axis wobble and jitter. Additional analyses can therefore provide mechanical rotation error estimates by subtracting estimated measurement errors from the frame-to-frame data point location differences. For example, rotation axis wobble can be obtained by best-fitting the data from each frame to the data in frame 1, noting the rotations necessary to perform the fits, and subtracting measurement rotation error from the results.

The rotation axis Wf and center of rotation $C_r$ are transformed from UVW coordinates to G coordinates in step 34 to provide the final results.

The point transformation matrices generated in step 26 are calculated using transformer Equation 1. This combination of translations X0G Y0G Z0G and Euler rotations A is key to generating a rotation axis without requiring prior knowledge of the approximate attitude of the axis in global G coordinates, in accordance with the present invention.

Equation 1:

$$\begin{vmatrix} Pi\ U \\ Pi\ V \\ Pi\ W \end{vmatrix} = -|A| \begin{vmatrix} X0G \\ *Y0G \\ Z0G \end{vmatrix} + |A| \begin{vmatrix} Pi\ XG \\ *Pi\ YG \\ Pi\ ZG \end{vmatrix}$$

where:
 Pi U, Pi V, Pi W=location of ith data point transformed from global G to UVW coordinates.

Equation 2:

$$A = \begin{vmatrix} CW\ CV & CW\ SV\ SU + SW\ CU & -CW\ SV\ CU + SW\ SU \\ -SW\ CV & -SW\ SV\ SU + CW\ CU & SW\ SV\ CU + CW\ SU \\ SV & -CV\ SU & CV\ CU \end{vmatrix}$$

Where A=large angle rotation matrix, S=sine, C=cosine, U=Ru rotation about U axis, V=Rv=rotation about V axis, W=Rw=rotation about W axis. The average axis of rotation is generated (step 34), with the axis of rotation for each data set being the local W axis {0; 0; 1} transformed from UVW to G coordinates. Note that the axes for each data set must be identical if the transformations are correct because they have a common Ru and Rv by definition. The rotation axis Wf is determined in global G coordinates.

Figure 5:
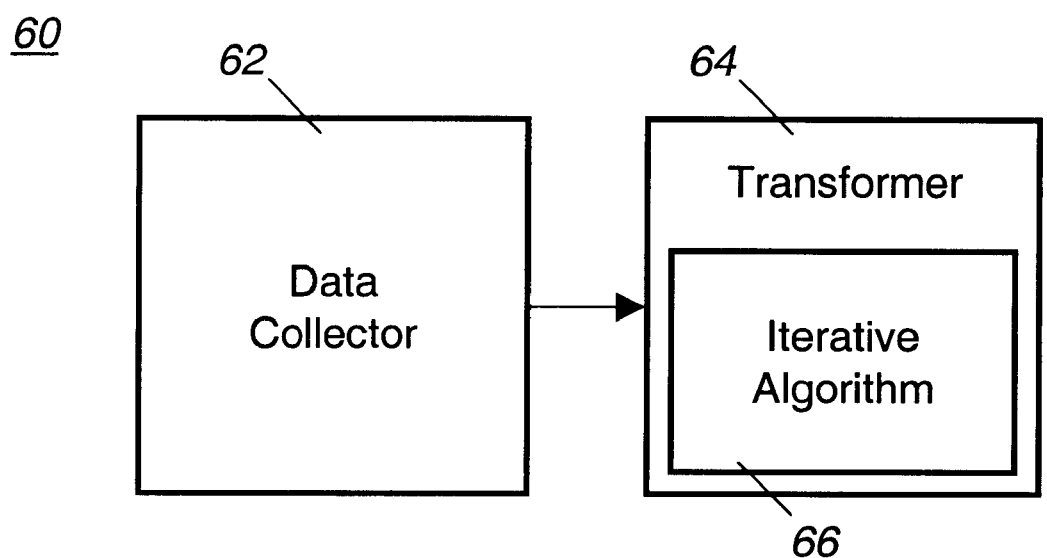
FIG. 5 is a block diagram of the system and apparatus of the present invention.

FIG. 5 illustrates a block diagram of the system and apparatus 60 in accordance with the present invention. The positions of a plurality of target points PN on the device 10 are measured by data collector 62. The device 10 is rotated to, and targets measured at, each of k angular positions. A transformer algorithm 64 and an optimization algorithm 66 translate and rotate the UVW coordinate frame in global G coordinates until the measured target locations P1 through PN are nominally invariant in UVW coordinates for each incremental target point data set. In this way, the W axis is made to be coincident with the device 10 average rotation axis Wf and the UVW origin is coincident with a center of rotation $C_r$ arbitrarily defined along vector Wf relative to the measured points P1–PN.

The present invention determines how far the device 10 was rotated about axis Wf between k+1 target point measurement sets. Such rotation calculations may be useful for diagnostic purposes, etc. Furthermore, the present invention can provide estimations of the Wf axis attitude wobble and center-of-rotation location runout in G coordinates, by subtracting measurement uncertainty from the calculated variations in rotation axis Wf and center-of-rotation $C_r$.

The present invention utilizes large angle Euler rotations which act directly on the measured data points to provide a solution method which is independent of the attitude of the rotation axis in global G coordinates. The present invention provides an accurate and efficient way of measuring the rotational axis of a rotating body. The center of rotation $C_r$ is calculatable with the use of the present invention, which was not available in the prior art. Rotational axis and lateral runout information and angular wobble can also be provided. Independent measurement of body rotations between point measurements is not required. The method may be applied to rotation ranges of less than one full revolution, if required by mechanism or facility limitations, for example. The target point data location information is used directly rather than being converted to auxiliary vector information, which reduces complexity and solution time. The invention uses specific coordinate translations and Euler rotations to facilitate the generation of unambiguous location and orientation knowledge for a rotation axis Wf having any arbitrary orientation in global coordinates.

While the invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, the present invention has been described herein for measuring the axis of rotation and center of rotation of a rotatable device. However, the invention may also be used to verify rotation axis alignment and obtain data base knowledge for rotary actuators, for example. The invention is preferably implemented in software, but may also be implemented in hardware, as well. It is therefore intended that the appended claims encompass any such modifications or embodiments.

What is claimed is:

1. A system for determining an average axis of a rotatable device, said rotatable device having a measured rotation axis nominally fixed in global coordinates, and having a plurality of target points affixed to the rotatable device, said system comprising:

a data collector adapted to obtain target point location data from said device target points for a plurality of rotated positions;

a transformer adapted to rotate and translate the obtained point data; and an iterative algorithm for positioning a secondary coordinate system associated with the obtained point data to be coincident with the average axis of rotation and center of rotation for at least one rotation axes of said rotatable device.

2. The system of claim 1 wherein said rotated positions of said rotatable device are measured incrementally.

3. The system of claim 2 wherein said secondary coordinate system is rotated through at least one Euler rotation relative to said global coordinates to measure said axis of rotation.

4. The system of claim 1 wherein said transformer comprises said iterative algorithm.

5. The system of claim 1 wherein said data collector comprises:

means for photogrammetrically determining said global coordinates of said target points.

6. The system of claim 1 wherein said data collector comprises:

means for videogrammetically determining said global coordinates of said target points.

7. The system of claim 1 wherein said target points are reflective.

8. The system of claim 1 further comprising:

means for calculating the center of rotation of said rotatable device;

means for determining axis angular wobble of said rotatable device; and means for determining axis positional runout of said rotatable device.

9. An apparatus for determining an average axis of rotation for a rotatable device, said rotatable device having a plurality of target points affixed thereon and having a measured rotation axis which is nominally fixed in global coordinates, comprising:

a data collector adapted to obtain global coordinates of said target points at a plurality of rotations of said rotatable device; and a transformer adapted to translate and rotate by means of Euler rotations said target point global coordinates to position a secondary coordinate system to be coincident with said rotatable device average axis of rotation and defined center of rotation.

10. The apparatus of claim 9 wherein said secondary coordinate system is rotated through said Euler rotations relative to said global coordinates to measure the axis of rotation.

11. The apparatus of claim 9 further comprising an iterative algorithm.

12. The apparatus of claim 9 wherein said data collector comprises:

means for photogrammetrically determining said global coordinates of said target points.

13. The apparatus of claim 9 wherein said data collector comprises:

means for videogrammetically determining said global coordinates of said target points.

14. The apparatus of claim 9 wherein said target points are reflective.

15. The apparatus of claim 9 further comprising:

means for calculating a center of rotation of said rotatable device;

means for determining axis wobble of said rotatable device; and means for determining axis runout of said rotatable device.

16. A method for determining an average axis of rotation of a rotatable device, said rotatable device having at least one rotation axis which is nominally fixed in global coordinates and having a plurality of target points affixed thereon, said method comprising the steps of:

obtaining target point location data from said plurality of target points for a plurality of rotated positions of said rotatable device, such that location point data sets are associated with each of the plurality of rotated positions; and translating and rotating said target point location data of the location point data sets to position a secondary coordinate system to be coincident with said average axis of rotation of said rotatable device including calculating the distance the device rotated between similar target points in the location point data sets.

17. The method of claim 16, further comprising the step of:

rotating said secondary coordinate system through Euler rotations relative to the global coordinates to measure the axis of rotation of said rotational device.

18. The method of claim 17 wherein said transformation step comprises an iterative algorithm.

19. The method of claim 18 further comprising the step of:

calculating a center of rotation of said device.

20. The method of claim 18 further comprising the steps of:

determining axis wobble of said rotatable device; and determining axis runout of said rotatable device.

21. The method of claim 16 wherein said obtaining step comprises:

photogrammetrically determining said target point global coordinates.

22. The method of claim 16 wherein said obtaining step comprises:

videogrammetrically determining said target point global coordinates.

23. The method of claim 16 wherein said transformation step is independent of an initial attitude of the rotational axis.

24. A system that determines an average axis of rotation and center of rotation of a rotational device, comprising:

a data collector that receives location data associated with a plurality of target points affixed to a rotational device at a plurality of rotational positions of the rotational device, the location data includes target position coordinates with respect to an initial coordinate system;

a transformer that employs the location data to translate and rotate a second coordinate system to place an origin of the second coordinate system at a center of rotation of the rotational device and place an axis of the second coordinate system along the average axis of rotation of the rotational device; and an iterative algorithm that iteratively modifies the translation and rotation of the second coordinate system to optimize a figure of merit calculated from the transformed target point location data.

25. A system as set forth in claim 24, the figure of merit being an error function.

26. A system as set forth in claim 25, the error function being the sum of the sum squared distances between location data associated with like target points in a first data set and K data sets associated with each rotational position of the rotational device after the target points have been rotated to be coincident with the target points in the first data set.

27. The method of claim 16, the transforming and rotating a secondary coordinate system to be coincident with said axis of rotation of said rotatable device comprising iteratively rotating and translating the secondary coordinate system as to optimize a figure of merit calculated from the transformed target point locations.

28. The method of claim 27, the figure of merit being an error function and the optimization being minimization of the error function, the error function being the sum of the sum squared distances between location data associated with like target points in a first data set and K data sets associated with each rotational position of the rotational device after the target points have been rotated to be coincident with the target points in the first data set.

* * * * *